United States Patent
Noguchi et al.

(10) Patent No.: US 7,276,276 B2
(45) Date of Patent: Oct. 2, 2007

(54) HONEYCOMB STRUCTURE PRODUCING METHOD, AND HONEYCOMB STRUCTURE

(75) Inventors: Yasushi Noguchi, Nagoya (JP); Tomoo Nakamura, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 309 days.

(21) Appl. No.: 10/509,866

(22) PCT Filed: Apr. 11, 2003

(86) PCT No.: PCT/JP03/04623

§ 371 (c)(1),
(2), (4) Date: Oct. 1, 2004

(87) PCT Pub. No.: WO03/091182

PCT Pub. Date: Nov. 6, 2003

(65) Prior Publication Data

US 2005/0255288 A1    Nov. 17, 2005

(30) Foreign Application Priority Data

Apr. 26, 2002 (JP) ............... 2002-126576
Nov. 5, 2002 (JP) ............... 2002-321079

(51) Int. Cl.
*B32B 3/12* (2006.01)
*B28B 1/44* (2006.01)

(52) U.S. Cl. .................... 428/116; 264/630
(58) Field of Classification Search ............... 428/116, 428/188; 264/630
See application file for complete search history.

(56) References Cited

U.S. PATENT DOCUMENTS 5,125,231 A * 6/1992 Patil et al. ............... 60/274
5,629,067 A * 5/1997 Kotani et al. ............... 428/116
6,077,483 A * 6/2000 Locker et al. ............... 422/179
2001/0033910 A1  10/2001 Ikeshima

FOREIGN PATENT DOCUMENTS

| | | |
|---|---|---|
| EP | 0 554 104 A2 | 8/1993 |
| EP | 0 884 459 A2 | 12/1998 |
| JP | 03-275309 A | 12/1991 |
| JP | 05-269388 A | 10/1993 |
| JP | 07-000183 Y2 | 1/1995 |

* cited by examiner

*Primary Examiner*—Jennifer C. McNeil
*Assistant Examiner*—Gordon R. Baldwin
(74) *Attorney, Agent, or Firm*—Oliff & Berridge, PLC

(57) ABSTRACT

In a method for producing a honeycomb structure 20 which comprises disposing a material for forming outer wall 11 on the outer peripheral surface 3 of a cell structure 1 having a plurality of cells serving as fluid flowing channels to produce a cell structure being provided with a material for forming outer wall 10 and firing the resulting cell structure being provided with a material for forming outer wall 10, wherein a cell structure being provided with a material for forming outer wall 10 in which the absolute value of the difference between the volumetric shrinkage percentage (firing shrinkage percentage) before and after firing of the cell structure 1 and the firing shrinkage percentage of the material for forming outer wall 11 is not more than 0.5% is produced and fired. There is provided a method for producing a honeycomb structure which comprises providing an outer wall on the outer peripheral surface and firing it, according to which the outer wall hardly cracks during firing and high-strength and large-sized honeycomb structure can be produced, and further provided is a high-strength and large-sized honeycomb structure in which the outer wall hardly cracks during firing.

29 Claims, 2 Drawing Sheets

HONEYCOMB STRUCTURE PRODUCING METHOD, AND HONEYCOMB STRUCTURE

TECHNICAL FIELD

The present invention relates to a method for producing a high-strength and large-sized honeycomb structure, and a high-strength and large-sized honeycomb structure.

BACKGROUND ART

Honeycomb structures comprising ceramics are used for collecting dusts and other particulate materials contained in exhaust gases discharged from automobiles and exhaust gases generated upon incineration of waste products, for purification of the exhaust gases by removing $NO_x$, CO, HC, etc. using supported catalysts or for purification of high-temperature exhaust gases discharged from production steps in various manufacturing and mining industries. The honeycomb structures are structures formed for collecting and removing particulate materials contained in dust-containing fluids. They have many fluid flowing cells which are partitioned with partition walls and which pierce through the honeycomb structures in axial direction, and the partition walls of the fluid flowing cells have filtering ability, and one end part of a certain fluid flowing cells is sealed and another end part of other fluid flowing cells is sealed. Furthermore, $NO_x$, CO, HC, etc. in exhaust gases can be removed by supporting catalysts on the surface and/or inside of the partition walls of the fluid flowing cells.

Recently, honeycomb structures are used suitably for purification of exhaust gases of diesel engine cars. For purification of exhaust gases discharged from diesel engines, it is necessary to adsorb and remove $NO_x$, CO, HC, etc., and simultaneously to collect particulates discharged from engines, and hence honeycomb structures are used as filters for removal of particulates having catalyst supported therein (DPF: diesel particulate filters). Moreover, honeycomb structures, of which end face is not sealed, are also used as catalyst carriers in diesel engine cars. The diesel engines are mounted on large-sized vehicles such as trucks and buses which are great in cylinder volume and hence the honeycomb structures must also be large-sized.

However, if honeycomb structures are large-sized, mechanical strength thereof decreases and therefore distortions and damages are apt to occur during use, which necessitates employment of a reinforcing means. As the reinforcing means, there is a method of disposing an outer wall on the outer peripheral surface of the honeycomb structures, but this method cannot be applied to large-sized honeycomb structures. For example, there is disclosed a method of providing an outer peripheral wall on the honeycomb structures, followed by firing, but this method gives no consideration to the difference between the proportion of dimensional shrinkage of the outer peripheral wall before and after firing (firing shrinkage percentage) and the proportion of volumetric shrinkage of the inner cell structure (ceramic honeycomb body), and, hence, when the cell structure is made larger in size, distortion is apt to occur during firing due to the difference in proportion of dimensional shrinkage before and after firing, resulting in breakage of the structure (e.g., UM (Utility Model)-B-7-183).

Furthermore, there is disclosed a method of providing an outer peripheral wall on a honeycomb structure to improve mechanical strength (e.g., Japanese Patent No.2604876). However, according to this method, the outer wall is low in strength, and may crack during handling or at the step of supporting of catalysts, which may lead to breaking. Moreover, if the amount of the bonding material such as colloidal silica is increased in order to enhance the strength, the coefficient of thermal expansion of the outer peripheral coat becomes higher than that of the inner cell structure (cordierite honeycomb), and there is the possibility of falling off of the outer peripheral coat part when subjected to thermal cycling. Further, there is disclosed a ceramic honeycomb structure, the outer periphery of which is coated with cordierite particles and/or ceramic fibers, and colloidal silica or colloidal alumina present between the outer periphery and the coat of cordierite particles and/or ceramic fibers (e.g., Japanese Patent No.2613729). However, this ceramic honeycomb structure is low in strength of the outer wall, and the outer wall may crack during handling or at the step of supporting of catalysts, resulting in breakage of the honeycomb structure. Moreover, if the amount of the bonding material such as colloidal silica is increased in order to enhance the strength, the coefficient of thermal expansion of the outer peripheral coat becomes higher than that of the inner cell structure (cordierite honeycomb), and there is the possibility of falling off of the outer peripheral coat part when subjected to thermal cycling.

The present invention has been made in an attempt to solve the above problems, and the object of the present invention is to provide a method for producing a honeycomb structure provided with an outer wall by disposing a material for forming outer wall on the outer peripheral surface, according to which the outer wall hardly cracks during firing and a high-strength and large-sized honeycomb structure can be produced, and, further object is to provide a high-strength and large-sized honeycomb structure with substantially no cracks in the outer wall.

DISCLOSURE OF INVENTION

In order to attain the above object, the following method for producing a honeycomb structure and the following honeycomb structure are provided by the present invention.

[1] A method for producing a honeycomb structure which comprises disposing a material for forming outer wall forming an outer wall upon firing on the outer peripheral surface of a cell structure having a plurality of cells serving as fluid flowing channels and partitioned by partition walls to produce a cell structure being provided with a material for forming outer wall and firing the resulting cell structure being provided with a material for forming outer wall to obtain a honeycomb structure comprising the cell structure provided with the outer wall on the outer peripheral surface thereof, characterized in that the cell structure being provided with a material for forming outer wall is produced by using the cell structure and the material for forming outer wall which are combined so that the absolute value of the difference between the proportion of the size of the cell structure shrinkage after firing to the size of the cell structure before firing and the proportion of the shrinkage in the size of the material for forming outer wall after firing to the size of the material for forming outer wall before firing is not more than 0.5%, and the resulting cell structure being provided with a material for forming outer wall is fired.

[2] A method for producing a honeycomb structure described in the above [1], wherein the main component of the cell structure and/or outer wall is a ceramics.

[3] A method for producing a honeycomb structure described in the above [1] or [2], wherein the cell structure being provided with a material for forming outer wall is produced so that the absolute value of the difference between the coefficient of thermal expansion of the cell structure after firing and that of the outer wall after firing is not more than $0.7 \times 10^{-6}/°C$.

[4] A method for producing a honeycomb structure described in any one of the above [1]-[3], wherein the cell structure being provided with a material for forming outer wall is produced so that the main component of the cell structure after firing is cordierite.

[5] A method for producing a honeycomb structure described in any one of the above [1]-[4], wherein the cell structure is unfired, and the cell structure being provided with a material for forming outer wall is produced by disposing the material for forming outer wall on the outer peripheral surface of the unfired cell structure and the resulting cell structure being provided with a material for forming outer wall is fired.

[6] A method for producing a honeycomb structure described in any one of the above [1]-[4], wherein the cell structure is previously fired, and the cell structure being provided with a material for forming outer wall is produced by disposing the material for forming outer wall on the outer peripheral surface of the fired cell structure and the resulting cell structure being provided with a material for forming outer wall is fired.

[7] A method for producing a honeycomb structure described in any one of the above [1]-[6], wherein the material for forming outer wall which forms the outer wall mainly composed of cordierite by firing is disposed.

[8] A method for producing a honeycomb structure described in the above [7], wherein the material for forming outer wall which is prepared from at least one material selected from the group consisting of talc, calcined talc, kaolin, calcined kaolin, alumina, aluminum hydroxide, mullite and silica so that the material contains cordierite as a main component after firing is disposed on the outer peripheral surface of the cell structure to produce the cell structure being provided with a material for forming outer wall and this cell structure being provided with a material for forming outer wall is fired to obtain the honeycomb structure having the outer wall containing cordierite as a main component.

[9] A method for producing a honeycomb structure described in any one of the above [6]-[8], wherein the material for forming outer wall contains a quartz powder in an amount of 1-15% by mass based on the whole material for forming outer wall.

[10] A method for producing a honeycomb structure described in any one of the above [1]-[9], wherein the cell structure being provided with a material for forming outer wall is produced by using the cell structure and the material for forming outer wall which are combined so that the absolute value of the difference between the proportion of shrinkage in the size of the cell structure after firing to the size of the cell structure before firing and the proportion of shrinkage in the size of the material for forming outer wall after firing to the size of the material for forming outer wall before firing is not more than 0.3%, and the resulting cell structure being provided with a material for forming outer wall is fired.

[11] A method for producing a honeycomb structure described in any one of the above [1]-[10], wherein the cell structure being provided with a material for forming outer wall is produced so that the absolute value of the difference between the coefficient of thermal expansion of the cell structure after firing and that of the outer wall after firing is not more than $0.4 \times 10^{-6}/°C$.

[12] A method for producing a honeycomb structure described in any one of the above [1]-[11], wherein the maximum diameter of a section formed by cutting the cell structure after firing along a plane perpendicular to the central axis is not less than 150 mm.

[13] A method for producing a honeycomb structure described in any one of the above [1]-[12], wherein the outer peripheral surface of the cell structure is formed of the surface of the outer peripheral wall provided on the outside of the cells positioned at the outermost periphery among a plurality of the cells.

[14] A method for producing a honeycomb structure described in any one of the above [1]-[12], wherein the outer peripheral surface of the cell structure is formed of the surface of the partition walls of the cells positioned at the outermost periphery among a plurality of the cells.

[15] A method for producing a honeycomb structure described in any one of the above [1]-[12], wherein the outer peripheral surface of the cell structure is formed by grinding at least a part of the outer peripheral wall of the cell structure which comprises a plurality of cells serving as fluid flowing channels and is provided with the outer peripheral wall on the outside of the cells positioned at the outermost periphery among a plurality of the cells.

[16] A method for producing a honeycomb structure described in any one of the above [1]-[15], wherein the surface of the outer wall of the honeycomb structure is subjected to a surface working.

[17] A method for producing a honeycomb structure described in any one of the above [1]-[16], wherein the honeycomb structure is cylindrical and the difference between the maximum diameter and the minimum diameter of the cylindrical honeycomb structure is not more than 1 mm.

[18] A method for producing a honeycomb structure described in any one of the above [1]-[17], wherein the raw material for the cell structure and the material for forming outer wall are kaolin and the average particle diameter of kaolin used as the material for forming outer wall is not less than $\frac{1}{10}$ and not more than $\frac{1}{2}$ of the average particle diameter of kaolin used as the raw material for the cell structure.

[19] A honeycomb structure provided with an outer wall on the outer peripheral surface of a cell structure which is produced by firing a cell structure being provided with a material for forming outer wall comprising a cell structure having a plurality of cells serving as fluid flowing channels and partitioned by partition walls and a material for forming outer wall disposed on the outer peripheral surface of the cell structure and forming an outer wall upon firing, characterized in that the absolute value of the difference between the proportion of shrinkage in the size of the cell structure after firing to the size of the cell structure before firing and the proportion of shrinkage in the size of the material for forming outer wall after firing to the size of the material for forming outer wall before firing is not more than 0.5%.

[20] A honeycomb structure described in the above [19], wherein the main component of the cell structure and/or outer wall is a ceramics.

[21] A honeycomb structure described in the above [19] or [20], wherein the absolute value of the difference between the coefficient of thermal expansion of the cell structure after firing and that of the outer wall after firing is not more than $0.7 \times 10^{-6}/°C$.

[22] A honeycomb structure described in any one of the above [19]-[21], wherein the main component of the cell structure after firing is cordierite.

[23] A honeycomb structure described in any one of the above [19]-[22], wherein the cell structure is unfired, and the cell structure being provided with a material for forming outer wall comprising the unfired cell structure and the material for forming outer wall disposed on the outer peripheral surface of the unfired cell structure is fired to produce the honeycomb structure.

[24] A honeycomb structure described in any one of the above [19]-[22], wherein the cell structure being provided with a material for forming outer wall comprising the previously fired cell structure and the material for forming outer wall disposed on the outer peripheral surface of the fired cell structure is fired to produce the honeycomb structure.

[25] A honeycomb structure described in any one of the above [19]-[24], wherein the main component of the outer wall after firing is cordierite.

[26] A honeycomb structure described in the above [25], wherein the cell structure being provided with a material for forming outer wall comprising the cell structure and the material for forming outer wall which is prepared using at least one material selected from the group consisting of talc, calcined talc, kaolin, calcined kaolin, alumina, aluminum hydroxide, mullite and silica so that the material contains cordierite as a main component after firing and which is disposed on the outer peripheral surface of the cell structure is fired, whereby the main component of the outer wall becomes cordierite.

[27] A honeycomb structure described in any one of the above [24]-[26], wherein the material for forming outer wall contains a quartz powder in an amount of 1-15% by mass based on the whole material for forming outer wall.

[28] A honeycomb structure described in any one of the above [19]-[27], wherein the cell structure being provided with a material for forming outer wall is produced so that the absolute value of the difference between the proportion of shrinkage in the size of the cell structure after firing to the size of the cell structure before firing and the proportion of shrinkage in the size of the material for forming outer wall after firing to the size of the material for forming outer wall before firing is not more than 0.3%.

[29] A honeycomb structure described in any one of the above [19]-[28], wherein the absolute value of the difference between the coefficient of thermal expansion of the cell structure after firing and that of the outer wall after firing is not more than $0.4 \times 10^{-6}/°C$.

[30] A honeycomb structure described in any one of the above [19]-[29], wherein the maximum diameter of the cell structure in a section formed by cutting the cell structure after firing along a plane perpendicular to the central axis is not less than 150 mm.

[31] A honeycomb structure described in any one of the above [19]-[30], wherein the outer peripheral surface of the cell structure is formed of the surface of the outer peripheral wall provided on the outside of the cells positioned at the outermost periphery among a plurality of the cells.

[32] A honeycomb structure described in any one of the above [19]-[30], wherein the outer peripheral surface of the cell structure is formed of the surface of the partition walls of the cells positioned at the outermost periphery among a plurality of the cells.

[33] A honeycomb structure described in any one of the above [19]-[30], wherein the outer peripheral surface of the cell structure is formed by grinding at least a part of the outer peripheral wall of the cell structure comprising a plurality of cells serving as fluid flowing channels and provided with the outer peripheral wall on the outside of the cells positioned at the outermost periphery among a plurality of the cells.

[34] A honeycomb structure described in any one of the above [19]-[33], wherein the surface of the outer wall of the honeycomb structure provided with the outer wall on the outer peripheral surface of the cell structure is subjected to a surface working.

[35] A honeycomb structure described in any one of the above [19]-[34], wherein the honeycomb structure is cylindrical and the difference between the maximum diameter and the minimum diameter of the cylindrical honeycomb structure is not more than 1 mm.

[36] A honeycomb structure described in any one of the above [19]-[35], wherein the cell structure and the outer wall contain kaolin and the average particle diameter of the kaolin contained in the outer wall is not less than $1/10$ and not more than $1/2$ of the average particle diameter of the kaolin contained in the cell structure.

BEST MODE FOR CARRYING OUT THE INVENTION

Figure 1:
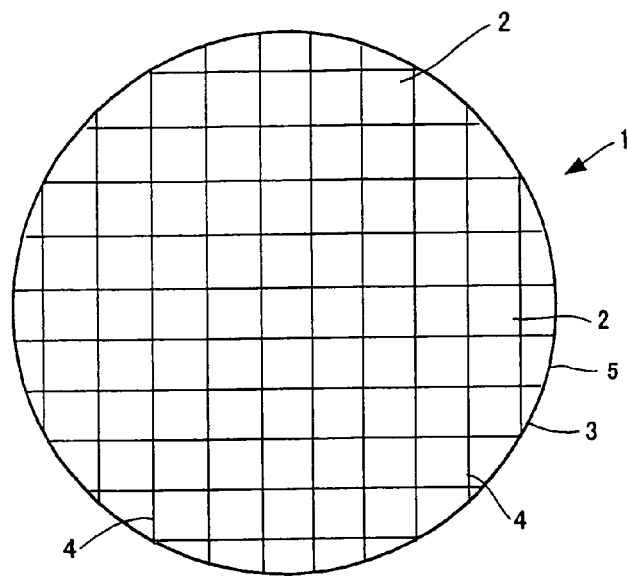
FIG. 1 is a sectional view of a cell structure made at an intermediate stage which is cut along a plane perpendicular to the central axis in one embodiment of the method for producing the honeycomb structure of the present invention.
Figure 2:
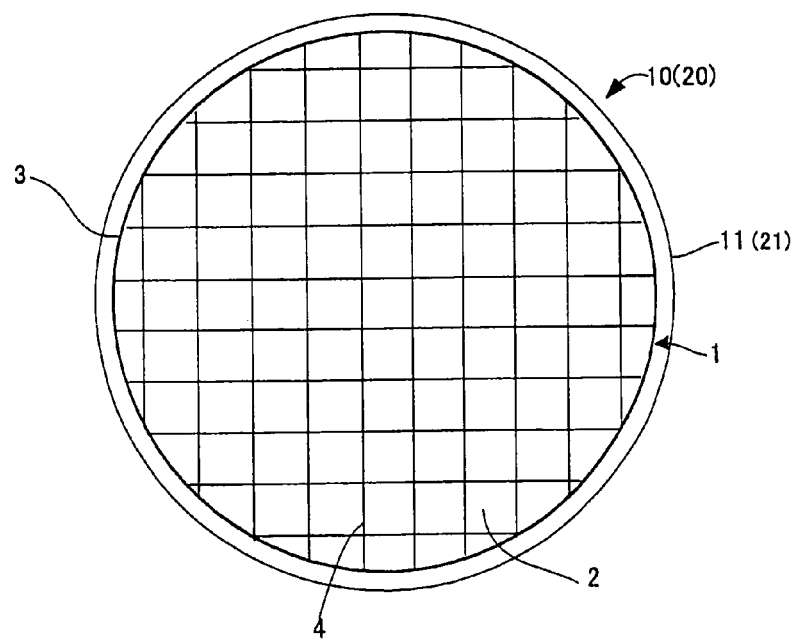
FIG. 2 is a sectional view of the honeycomb structure cut along a plane perpendicular to the central axis of the present invention.

According to the method for producing a honeycomb structure and the honeycomb structure of the present invention, a cell structure, on the outer peripheral surface of which is disposed a material for forming outer wall, is fired to produce a honeycomb structure in which the difference between the proportion of shrinkage in size before and after firing of the cell structure and the proportion of shrinkage in size before and after firing of the material for forming outer wall is set at not more than 0.5%. Therefore, the outer wall hardly cracks during firing and thus a high-strength and large-sized honeycomb structure can be produced, and a high-strength and large-sized honeycomb structure in which the outer wall hardly cracks can be provided.

The embodiments of the present invention will be specifically explained referring to the drawings, but they should not be construed as limiting the invention in any manner, and it should be understood that optional changes, modifications and improvements may be made based on the normal knowledge of one skilled in the art without departing from the spirit and scope of the invention.

According to one embodiment of the method for producing a cell structure of the present invention, first a cylindrical cell structure 1 is produced by a general extrusion molding method and dried. FIG. 1 is a sectional view of a cell structure 1 made at an intermediate stage which is cut along a plane perpendicular to the central axis, in the method for producing the honeycomb structure of the present invention. The cell structure 1 comprises many cells 2 which are partitioned (compartmented) by partition walls 4 and pierce through the cell structure in the central axis direction and has an outer peripheral wall 5 formed on the outside of the cells positioned at the outermost periphery. The surface of the outer peripheral wall 5 forms the outer peripheral surface 3 of the cell structure 1.

Next, a material for forming outer wall (a slurry for forming the outer wall) which forms the outer wall by firing is coated on the outer peripheral surface 3 of the resulting cell structure 1 to dispose the material for forming outer wall 11 to produce a cell structure being provided with a material for forming outer wall 10, which is fired to obtain a honeycomb structure 20 comprising the cell structure 1 provided with an outer wall 21 on the outer peripheral surface.

The firing conditions are such that the cell structure being provided with a material for forming outer wall is kept at 1410-1430° C. for 3-7 hours.

In the method for producing the honeycomb structure of this embodiment, as the cell structure 1 and the material for forming outer wall 11, they are used in combination so that the absolute value of the difference between the proportion of shrinkage in the size of the cell structure 1 after firing to the size of the cell structure 1 before firing (hereinafter referred to as "firing shrinkage percentage of cell structure 1") and the proportion of the shrinkage in the size of the material for forming outer wall 11 after firing to the size of the material for forming outer wall 11 before firing (hereinafter referred to as "firing shrinkage percentage of material for forming outer wall 11") is not more than 0.5%, preferably not more than 0.3%. If the difference is more than 0.5%, since the absolute value of the difference between the firing shrinkage percentage of cell structure 1 and firing shrinkage percentage of material for forming outer wall 11 is great, the outer wall 21 cracks during firing (after firing), which is not preferred. Here, the firing shrinkage percentage of the cell structure 1 is a value obtained by subtracting the size of the cell structure 1 after firing from the size of the cell structure 1 before firing and dividing the resulting subtraction value by the size of the cell structure 1 before firing, and can be shown by the following formula (1).

$$\text{(Firing shrinkage percentage of cell structure 1)} \ (\%) = 100 \times ((\text{size of cell structure 1 before firing}) - (\text{size of cell structure 1 after firing}))/(\text{size of cell structure 1 before firing}) \quad (1)$$

The size of the cell structure 1 before and after firing can be obtained by measuring the diameter of circle in the case of cylindrical cell structure. The firing shrinkage percentage of the material for forming outer wall 11 is measured by firing only the material for forming outer wall 11 without disposing the material for forming outer wall 11 on the outer peripheral surface of the cell structure 1. For example, a plate of about 50 mm×50 mm×50 mm is made from the material for forming outer wall, and the size thereof before and after firing is measured. Analysis of the firing shrinkage percentage of the material for forming outer wall 11 is conducted by the above formula (1) where "cell structure 1" is replaced with "material for forming outer wall 11".

In the honeycomb structure 20 produced by the method for producing a honeycomb structure of this embodiment, the absolute value of the difference between the coefficient of thermal expansion of the cell structure 1 after firing and that of the outer wall 21 after firing is preferably not more than $0.7 \times 10^{-6}/°$ C., more preferably not more than $0.4 \times 10^{-6}/°$ C. If it is more than $0.7 \times 10^{-6}/°$ C., thermal shock resistance of the honeycomb structure deteriorates and cracks are sometimes produced by thermal cycles.

Measurement of the coefficient of thermal expansion is carried out by measuring dimensional change ▪L at a temperature from 40° C. to 800° C. The coefficient of thermal expansion is a value obtained by dividing the dimensional change ▪L by the sample size L at 40° C. and the temperature (800° C.-40° C.), and is shown by the following formula (2).

$$\text{Coefficient of thermal expansion } (/° C.) = \blacksquare L/(L \times 760) \quad (2)$$

The cell structure 1 and outer wall 21 after firing are mainly composed of preferably a ceramics, more preferably cordierite. Particularly, as for the outer wall 21, it is preferred that a composition comprising at least one selected from the group consisting of talc, calcined talc, kaolin, calcined kaolin, alumina, aluminum hydroxide, mullite and silica is prepared so that it contains cordierite as a main component after firing, the resulting composition is contained in the material for forming outer wall 11, then this material for forming outer wall 11 is coated (disposed) on the outer peripheral surface 3 of the cell structure 1 to produce the cell structure being provided with a material for forming outer wall 10, and this cell structure being provided with a material for forming outer wall 10 is fired to allow the outer wall 21 after firing to contain cordierite as a main component. Furthermore, when the cell structure is previously fired and the material for forming outer wall is disposed on the outer peripheral surface of the fired cell structure, it is preferred to use (contain) a quartz powder in the material for forming outer wall in an amount of 1-15% by mass based on the whole material for forming outer wall because the absolute value of the difference in firing shrinkage percentage between the cell structure and the material for forming outer wall can be adjusted to not more than 0.5%.

All of the cell structure 1, the cell structure being provided with a material for forming outer wall 10 and the honeycomb structure 20 are preferably cylindrical with having a central axis in the same direction as the central axis of the cells 2, and the sectional shapes thereof when they are cut along a plane perpendicular to the central axis of them are not particularly limited, and may be circle, oval (ellipse), polygons such as square and rectangle, and other indeterminate shapes.

The thickness of outer wall 21 is preferably 0.5-2.0 mm. If the thickness is less than 0.5 mm, the outer wall 21 is thin and it becomes sometimes difficult to maintain the strength of the honeycomb structure. If it is more than 2.0 mm, a temperature gradient in the outer wall 21 is apt to occur to cause reduction in thermal shock resistance.

The honeycomb structure 20 produced by the method of this embodiment is suitable when the cell structure 1 after firing has a maximum diameter of 150 mm or more of the section formed by cutting the cell structure along a plane perpendicular to the central axis. Since the material for forming outer wall 11 used in this embodiment is disposed on the outer peripheral surface 3 of the cell structure 1 and is fired, the cell structure has high strength and the outer wall hardly cracks during firing, and thus is suitably usable for a large-sized honeycomb structure. The maximum diameter of the section of the cell structure cut along a plane perpendicular to the central axis of the cell structure means a diameter (maximum diameter) of a section having the maximum diameter among the sections of the cell structure cut along the planes perpendicular to the central axis of the cell structure (among optional sections formed along the central axis). In the case of the sectional shape being circle, the maximum diameter is a diameter of the circle; in the case of the sectional shape is oval or ellipse, it is a length of the major axis; in the case of a polygon, it is a length of the longest diagonal line; and in the case of indeterminate shape, it is a length (distance between two points) of a portion having the longest distance between two points which are taken on the outer periphery of the sectional profile. The honeycomb structure of the present invention is one which is obtained by the above-mentioned method for producing a honeycomb structure according to the present invention.

In the method for producing a honeycomb structure of this embodiment, it is preferred that kaolin is used as the raw material for the cell structure 1 and the material for forming outer wall 11 and the average particle diameter of the kaolin used as the material for forming outer wall 11 is not less than ⅒ and not more than ½ of the average particle diameter of the kaolin used as the raw material for the cell structure 1. It is generally known that in the case of a cordierite honeycomb, plate particles such as kaolin and talc in the raw material are orientated by extrusion molding, and thus the cordierite crystals after firing are also orientated to give a low coefficient of thermal expansion. However, in case a material for forming outer wall (slurry for the formation of outer wall) is coated, the raw material (material) particles are not orientated and hence it is difficult to obtain a low coefficient of thermal expansion such as of a honeycomb (cell structure) which is extrusion molded using plate particles such as kaolin and talc as raw materials after firing. However, when particulate kaolin is used as a raw material, microcracks are produced and the coefficient of thermal expansion can be made smaller. Therefore, when kaolin is used as the raw material for the cell structure 1 and the material for forming outer wall 11 and the average particle diameter of kaolin used as the material for forming outer wall 11 is not less than ⅒ and not more than ½ of the average particle diameter of kaolin used as the raw material for the cell structure 1, the coefficient of thermal expansion of the outer wall 21 can be reduced, the absolute value of the difference between the coefficients of thermal expansion of the cell structure 1 and the outer wall 21 can be made smaller, and thus the thermal shock resistance can be improved. If the average particle diameter of kaolin is less than ⅒, increase of firing shrinkage percentage is caused, and outer wall 21 cracks during firing. Here, the average particle diameter is measured by laser diffraction method using LA-910 manufactured by Horiba Seisakusho Co., Ltd. Furthermore, for improving the thermal shock resistance, the average particle diameter of kaolin contained in outer wall 21 of the resulting honeycomb structure 20 is preferably not less than ⅒ and not more than ½ of the average particle diameter of kaolin contained in the cell structure 1 after firing.

In the method for producing a honeycomb structure of this embodiment, as the cell structure 11, there may be used unfired cell structure and the material for forming outer wall 11 may be disposed on the outer peripheral surface 3 thereof, or a previously fired cell structure 1 may be used and the material for forming outer wall 11 may be disposed on the outer peripheral surface 3.

In the case of using unfired cell structure 1, the material for forming outer wall 11 is disposed on the outer peripheral surface 3 of the unfired cell structure 1 to produce a cell structure being provided with a material for forming outer wall 10, and this cell structure being provided with a material for forming outer wall 10 is fired to produce the honeycomb structure 20. In this case, the step for previously firing the cell structure 1 can be omitted, and thus the production efficiency can be improved.

When the cell structure 1 is previously fired, the material for forming outer wall 11 is disposed on the outer peripheral surface 3 of the fired cell structure 1 to produce a cell structure being provided with a material for forming outer wall 10, and this cell structure being provided with a material for forming outer wall 10 is fired to produce the honeycomb structure 20. In this case, it is preferred to contain a quartz powder in the material for forming outer wall in an amount of 1-15% by mass based on the whole material for forming outer wall 11. In the case of disposing the material for forming outer wall on the previously fired cell structure 1, followed by firing, the cell structure 1 hardly shrinks in size by the second firing because the cell structure 1 has been once fired, but when 1-15% by mass of quartz powder is added to the material for forming outer wall, the firing shrinkage percentage of the material for forming outer wall can be lowered, and hence the absolute value of the difference in firing shrinkage percentage between the cell structure 11 and the material for forming outer wall can be reduced and thus a honeycomb structure, the outer wall of which hardly cracks during firing, can be obtained. If the quartz is used in more than 15%, the coefficient of thermal expansion of the material for forming outer wall increases to cause deterioration of thermal shock resistance and occurrence of cracks by thermal cycling.

In the method for producing a honeycomb structure of this embodiment, it is preferred that the cell structure being provided with a material for forming outer wall 10 is fired to produce a honeycomb structure comprising the cell structure 1 and the outer wall 21 provided thereon, and the outer wall 21 is subjected to surface working to make a honeycomb structure 20 having a given shape. By the surface working, the honeycomb structure can be finished to one which is higher in dimensional accuracy.

In the method for producing a honeycomb structure of this embodiment, it is preferred that the honeycomb structure is cylindrical and the difference between the maximum diameter and the minimum diameter is 1 mm or less. If the difference is larger than 1 mm, the face pressure at the time of canning becomes ununiform and the honeycomb structure may break by the canning. Here, the maximum diameter of the cylindrical honeycomb structure means a diameter of a section having the maximum diameter among the sections of the honeycomb structure cut along the planes perpendicular to the central axis of the honeycomb structure (among optional sections formed along the central axis). Furthermore, the minimum diameter of the cylindrical honeycomb structure means a diameter of a section having the minimum diameter among the sections of the honeycomb structure cut along the planes perpendicular to the central axis of the honeycomb structure (among optional sections formed along the central axis).

In the method for producing a honeycomb structure of this embodiment, the outer peripheral surface 3 of the cell structure 1 is formed of the surface of the outer peripheral wall 5 provided on the outside of the cells positioned at the outermost periphery among a plurality of cells 2 as shown in FIG. 1. By forming the outer peripheral wall 5 in this way, the outer peripheral wall 5 can be formed in a given shape with high accuracy, and hence the shape of the honeycomb structure provided with outer wall 21 can be formed with high accuracy.

Figure 3:
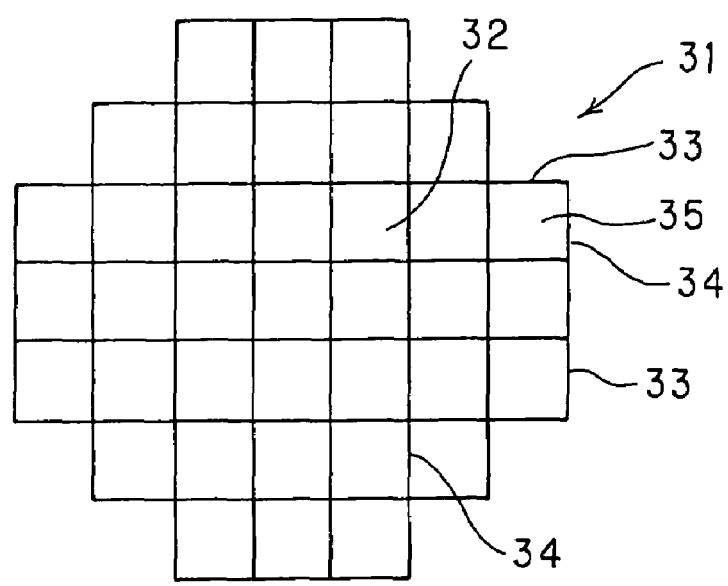
FIG. 3 is a sectional view of a cell structure made at an intermediate stage which is cut along a plane perpendicular to the central axis in another embodiment of the method for producing the honeycomb structure of the present invention.

According to the method for producing a honeycomb structure of another embodiment, in a cell structure 31 produced at an intermediate stage, its outer peripheral surface 33 is formed of the surface of partition walls 34 of cells 35 positioned at the outermost periphery among a plurality of cells 32 as shown in FIG. 3. A cell structure being provided with a material for forming outer wall (not shown) is produced by disposing the material for forming outer wall on the outer peripheral surface 33 of the cell structure 31, and is fired to make a honeycomb structure (not shown). In this way, since the surface of the partition walls 34 having unevenness serves as the outer peripheral surface 33 of the cell structure 31 and the area of contacting (adhering) with the outer wall is great, the adhesion between the outer wall and the outer peripheral surface 33 becomes stronger, resulting in excellent thermal shock resistance, and thus cracks hardly occur due to thermal cycling. The outer peripheral surface 33 of the cell structure 31 may be such that at least a part of the cells of the outermost periphery are broken or at least a part of the cells are ground and the wall surface inside the cells is externally exposed to form a part of the outer peripheral surface 33. The method for producing a honeycomb structure of this another embodiment is the same as the method of the first embodiment of the present invention, except that the shape of the cell structure 31 is different from the shape of the cell structure 1 shown in FIG. 1.

Furthermore, in the method for producing a honeycomb structure according to still another embodiment, the outer peripheral surface of the cell structure may be formed by grinding at least a part of an outer peripheral wall of a cell structure which comprises a plurality of cells serving as fluid flowing channels and is provided with the outer peripheral wall on the outside of the cells positioned at the outermost periphery among a plurality of the cells. A material for forming outer wall is disposed on the outer peripheral surface of the cell structure (the portion where the partition walls are exposed to the outer periphery as a result of grinding) to produce a cell structure being provided with a material for forming outer wall, which is fired to make a honeycomb structure. In this way, since the outer peripheral wall of the cell structure is ground, the partition walls having unevenness is exposed to outer periphery, and the surface of the partition walls serves as the outer peripheral surface to increase the area of contacting (adhering) with the outer wall. As a result, the outer wall and the outer peripheral surface (the portion where the partition walls are exposed to outer periphery as a result of grinding) are adhered more strongly at the contacting face of them, resulting in more excellent thermal shock resistance, and thus cracks due to thermal cycling occur more difficultly. The method for producing a honeycomb structure of this still another embodiment is the same as the method of the first embodiment of the present invention, except that the shape of the cell structure is different from the shape of the cell structure 1 shown in FIG. 1.

The honeycomb structure of the present invention is one which is obtained by the method for producing the honeycomb structure according to the present invention as mentioned above. The honeycomb structure hardly cracks in its outer wall and is high in strength and large in size since it is produced by the method for producing the honeycomb structure according to the present invention.

EXAMPLE

The present invention will be more specifically explained by the following examples, which should not be construed as limiting the invention in any manner.

The inorganic raw materials shown in Table 1 were weighed in accordance with the composition of I shown in Table 2. To 100 parts by mass of the inorganic raw materials were added 4 parts by mass of methyl cellulose, 0.1 part by mass of potassium laurate and 33 parts by mass of water, followed by mixing and kneading to prepare a clay for molding. This was formed into a columnar clay by a vacuum kneading machine, from which a honeycomb (cell structure having outer peripheral wall) was molded by a ram type extrusion molding machine. The resulting honeycomb was dried by a dielectric drying machine and completely dried by a hot-air drying machine. This honeycomb was cut at both end parts to a given length, and fired by keeping at a maximum temperature of 1425° C. for 4 hours to obtain a cell structure mainly composed of cordierite. The outer peripheral part (outer peripheral wall) was subjected to grinding so as to result in a given outer diameter. Ten cell structures were prepared in this way. Next, raw materials having the compositions A-J shown in Table 2 were weighed, and to 100 parts by mass of the inorganic raw materials having each of the compositions were added 0.5 part by mass of methyl cellulose, 0.3 part by mass of a dispersant and 44 parts by mass of water, followed by mixing and kneading to obtain a slurry for forming outer wall (material for forming outer wall) which had each of the compositions. The slurry for forming outer wall was coated on the outer peripheral surface of the above cell structure, the outer peripheral part of which was subjected to grinding, and the coated cell structure was dried and fired by keeping it at a temperature of 1425° C. for 4 hours (Examples 1-6, Examples 9-10 and Comparative Examples 1 and 2). After the firing, the outer wall of the honeycomb structures of Examples 1-6 and 9-10 did not crack, while the outer wall of Comparative Examples 1 and 2 cracked. The outer diameter of the honeycomb structures was 241 mm, the height was 152 mm, the thickness of rib was 150 mm, and the cell pitch was 1.27 mm. A test piece was prepared by drying and solidifying the slurry for forming outer wall, and firing shrinkage percentage was measured on the resulting test piece. Further, using the test piece, coefficient of thermal expansion of the outer wall at 40-800° C. was measured. Furthermore, the resulting honeycomb structures were subjected to thermal cycle test by the following method. The results are shown in Table 3.

(Method of Thermal Cycle Test)

The honeycomb structure obtained by forming the outer wall on the cell structure and firing it was kept in an electric furnace of 600° C. for 2 hours. The honeycomb structure was taken out in a room of 20° C. and kept for 2 hours. This procedure was repeated ten times, and thereafter occurrence of cracks on the outer wall was visually examined.

The inorganic raw materials shown in Table 1 were mixed in accordance with the composition of B in Table 2, and two cell structures (fired products B) were produced in the same manner as in the production of the above cell structures, and slurries for forming outer wall were obtained in accordance with the compositions of E and B in Table 2 by the above method for producing the slurry for forming outer wall. Each of the slurries having the compositions of E and B for forming outer wall was coated on the outer peripheral surface of the above cell structure, the outer peripheral part of which was subjected to grinding (fired product B), and the coated cell structure was dried and fired by keeping it at a temperature of 1425° C. for 4 hours to obtain honeycomb structures (Examples 7 and 11). After the firing, there were no cracks on the outer wall of the honeycomb structures of Examples 7 and 11. Furthermore, the resulting honeycomb structures were subjected to the above thermal cycle test. The results are shown in Table 3.

The inorganic raw materials shown in Table 1 were mixed in accordance with the composition of I in Table 2, and a cell structure (green product I) was produced in the same manner as in the production of the above cell structures, except that firing was not carried out, and a slurry for forming outer wall was obtained in accordance with the composition of B in Table 2. The slurry for forming outer wall having the composition B was coated on the outer peripheral surface of the above cell structure, the outer peripheral part of which was subjected to grinding (green product I), and the coated cell structure was dried and fired by keeping it at a temperature of 1425° C. for 4 hours (Example 8). After the firing, there were no cracks on the outer wall of the honeycomb structure of Example 8. Furthermore, the resulting honeycomb structure was subjected to the above thermal cycle test. The results are shown in Table 3.

TABLE 1

|  | Average particle diameter(μm) |
|---|---|
| Talc | 11 |
| Calcined talc | 12 |
| Kaolin 1 | 11 |
| Kaolin 2 | 5 |
| Kaolin 3 | 2 |
| Kaolin 4 | 1.2 |
| Kaolin 5 | 0.6 |
| Calcined kaolin | 2 |
| Alumina | 5 |
| Aluminum hydroxide | 1.5 |
| Quartz | 7 |
| Mullite | 9 |

TABLE 2

|  | Talc | Calcined talc | Kaolin | Calcined kaolin | Alumina | Aluminum hydroxide | Quartz | Mullite |
|---|---|---|---|---|---|---|---|---|
| A | 20 | 19 | 22(2) | 21 | 8 | 9 | 1 | 0 |
| B | 20 | 19 | 18(2) | 17 | 10 | 11 | 5 | 0 |
| C | 20 | 20 | 7(2) | 6 | 16 | 16 | 15 | 0 |
| D | 20 | 20 | 10(2) | 9 | 11 | 10 | 10 | 10 |
| E | 20 | 19 | 18(3) | 17 | 10 | 11 | 5 | 0 |
| F | 20 | 19 | 18(4) | 17 | 10 | 11 | 5 | 0 |
| G | 20 | 19 | 23(2) | 22 | 8 | 8 | 0 | 0 |
| H | 20 | 20 | 2(2) | 1 | 19 | 18 | 20 | 0 |
| I | 20 | 19 | 18(1) | 17 | 10 | 11 | 5 | 0 |
| J | 20 | 19 | 18(5) | 17 | 10 | 11 | 5 | 0 |

Unit: % by mass
The numeral value in the parenthesis in the column kaolin indicates its grade.

TABLE 3

|  | Cell structure | Composition of material for forming outer wall | Firing shrinkage Percentage (%) Cell structure (1) | Firing shrinkage Percentage (%) Material for forming outer wall | (2) − (1) | Cracks by firing | Coefficient of thermal expansion (×10⁻⁶/° C.) Cell structure (3) | Coefficient of thermal expansion (×10⁻⁶/° C.) Outer wall (4) | (4) − (3) | Thermal cycle test Occurrence of cracks |
|---|---|---|---|---|---|---|---|---|---|---|
| Example 1 | Fired product I | A | 0.0 | 0.5 | 0.5 | None | 0.5 | 0.8 | 0.3 | None |
| Example 2 | Fired product I | B | 0.0 | 0.3 | 0.3 | None | 0.5 | 1.1 | 0.6 | None |
| Example 3 | Fired product I | C | 0.0 | 0.1 | 0.1 | None | 0.5 | 1.2 | 0.7 | None |
| Example 4 | Fired product I | D | 0.0 | 0.1 | 0.1 | None | 0.5 | 1.0 | 0.5 | None |
| Example 5 | Fired product I | E | 0.0 | 0.4 | 0.4 | None | 0.5 | 0.9 | 0.4 | None |
| Example 6 | Fired product I | F | 0.0 | 0.5 | 0.5 | None | 0.5 | 0.7 | 0.2 | None |
| Example 7 | Fired product B | E | 0.0 | 0.3 | 0.3 | None | 0.3 | 0.8 | 0.5 | None |
| Example 8 | Green product | B | 0.2 | 0.3 | 0.1 | None | 0.7 | 1.1 | 0.4 | None |
| Example 9 | Fired product I | H | 0.0 | 0.0 | 0.0 | None | 0.5 | 1.5 | 1.0 | Occurred |
| Example 10 | Fired product I | I | 0.0 | 0.2 | 0.2 | None | 0.5 | 1.3 | 0.8 | Occurred |
| Example 11 | Fired product B | B | 0.0 | 0.3 | 0.3 | None | 0.3 | 1.1 | 0.8 | Occurred |
| Comparative Example 1 | Fired product I | G | 0.0 | 0.8 | 0.8 | Occurred | 0.5 | 0.8 | 0.3 | None |
| Comparative Example 2 | Fired product I | J | 0.0 | 0.6 | 0.6 | Occurred | 0.5 | 0.6 | 0.1 | None |

Material for forming outer wall = slurry for formation of outer wall

It can be seen from Table 3 that cracks hardly occurred in thermal cycle test conducted on the honeycomb structures in which the cell structure and the outer wall were combined so that the absolute value of the difference between the coefficient of thermal expansion of the cell structure and that of the outer wall was not more than $0.7 \times 10^{-6}$/° C.

INDUSTRIAL APPLICABILITY

As mentioned above, according to the method for producing a honeycomb structure of the present invention, high-strength and large-sized honeycomb structures in which the outer wall hardly cracks during firing can be produced. According to the honeycomb structure of the present invention, the outer wall can hardly crack even when the honeycomb structure is high in strength and large in size.

The invention claimed is:

1. A method for producing a honeycomb structure having an outer wall and a cell structure comprising a plurality of cells serving as fluid flowing channels and partitioned by partition walls, the method comprising:
preparing a material for forming the outer wall using at least one material selected from the group consisting of talc, calcined talc, kaolin, calcined kaolin, alumina, aluminum hydroxide, mullite and silica, in proportions such that, after firing, the material for forming outer wall contains cordierite as a main component and contains a quartz powder in an amount of 1-15% by mass based on the whole material for forming outer wall;

forming the outer wall from the material by disposing the material on the outer peripheral surface of the cell structure, the material configured, such that the absolute value of the difference between the proportion of shrinkage in the size of a cell structure after firing to the size of the cell structure before firing and the proportion of shrinkage in the size of the material for forming outer wall after firing to the size of the material for forming outer wall before firing is not more than 0.5%; and firing the cell structure with the material for the outer wall disposed thereto, to produce the honeycomb structure, wherein, the cell structure after firing has a section formed by cutting along a plane perpendicular to the central axis whose maximum diameter is 150 mm or more, and wherein kaolin is used as a raw material for the cell structure and the material for forming outer wall, wherein an average particle diameter of kaolin used as the material for forming outer wall is 1/10 or more and 1/2 or less of an average particle diameter of kaolin used as the raw material for the cell structure.

2. A method for producing a honeycomb structure according to claim 1, wherein the main component of the cell structure and/or outer wall is a ceramics.

3. A method for producing a honeycomb structure according to claim 1, wherein the cell structure being provided with a material for forming outer wall is produced so that the absolute value of the difference between the coefficient of thermal expansion of the cell structure after firing and that of the outer wall after firing is not more than $0.7\times10^{-6}/°$ C.

4. A method for producing a honeycomb structure according to claim 1, wherein the cell structure being provided with a material for forming outer wall is produced so that the main component of the cell structure after firing becomes cordierite.

5. A method for producing a honeycomb structure according to claim 1, wherein the cell structure is unfired, wherein the material for forming outer wall is disposed on the outer peripheral surface of the unfired cell structure to produce a cell structure being provided with a material for forming outer wall, and the resulting cell structure being provided with a material for forming outer wall is fired.

6. A method for producing a honeycomb structure according to claim 1, wherein the cell structure is previously fired, the material for forming outer wall is disposed on the outer peripheral surface of the fired cell structure to produce the cell structure being provided with a material for forming outer wall, and the resulting cell structure being provided with a material for forming outer wall is fired.

7. A method for producing a honeycomb structure according to claim 1, wherein the material for forming the outer wall is mainly composed of cordierite after firing.

8. A method for producing a honeycomb structure according to claim 1, wherein the absolute value of the difference between the proportion of shrinkage in the size of the cell structure after firing to the size of the cell structure before firing and the proportion of shrinkage in the size of the material for forming outer wall after firing to the size of the material for forming outer wall before firing is not more than 0.3%.

9. A method for producing a honeycomb structure according to claim 8, wherein an absolute value of difference between the thermal expansion coefficient of the cell structure after firing and that of the outer wall after firing is not more than $0.4\times10^{-6}/°$ C.

10. A method for producing a honeycomb structure according to claim 8, wherein the cell structure has an outer peripheral surface being formed of the surface of the outer peripheral wall provided on the outside of the cells positioned at the outermost periphery among a plurality of the cells.

11. A method for producing a honeycomb structure according to claim 8, wherein the cell structure has an outer peripheral surface being formed of the surface of the partition walls of the cells positioned at the outermost periphery among a plurality of the cells.

12. A method for producing a honeycomb structure according to claim 8, wherein the outer peripheral surface of the cell structure is formed by grinding at least a part of the outer peripheral wall of the cell structure comprising a plurality of cells serving as fluid flowing channels and provided with the outer peripheral wall on the outside of the cells positioned at the outermost periphery among a plurality of the cells.

13. A method for producing a honeycomb structure according to claim 8, wherein the surface of the outer wall of the honeycomb structure is subjected to a surface working.

14. A method for producing a honeycomb structure according to claim 8, wherein the honeycomb structure is cylindrical and difference between the maximum diameter and the minimum diameter of the cylindrical honeycomb structure is not more than 1 mm.

15. A honeycomb structure comprising:

a cell structure provided with an outer wall on the outer peripheral surface thereof which is produced by firing a cell structure being provided with a material for forming outer wall including: a cell structure having a plurality of cells serving as fluid flowing channels and partitioned by partition walls and a material for forming outer wall which is disposed on the outer peripheral surface of the cell structure and forms an outer wall upon firing on the cell structure, wherein the outer wall includes such a material that the absolute value of the difference between the proportion of shrinkage in the size of the cell structure after firing to the size of the cell structure before firing and the proportion of shrinkage in the size of the material for forming outer wall after firing to the size of the material for forming outer wall before firing is not more than 0.5%, and the outer wall contains at least one material selected from the group consisting of talc, calcined talc, kaolin, calcined kaolin, alumina, aluminum hydroxide, mullite and silica so that the material for forming outer wall after firing contains cordierite as a main component and contains a quartz powder in an amount of 1-15% by mass based on the whole of the material for forming outer wall, and wherein the cell structure and the outer wall contain kaolin and the average particle diameter of kaolin contained in the material for forming outer wall is 1/10 or more and 1/2 or less of the average particle diameter of kaolin contained in the cell structure.

16. A honeycomb structure according to claim 15, wherein the main component of the cell structure and/or outer wall is a ceramics.

17. A honeycomb structure according to claim 15, wherein the absolute value of the difference between the coefficient of thermal expansion of the cell structure after firing and that of the outer wall after firing is not more than $0.7 \times 10^{-6}/°C$.

18. A honeycomb structure according to claim 15, wherein the main component of the cell structure after firing is cordierite.

19. A honeycomb structure according to claim 15, wherein the cell structure is a fired cell structure produced by firing a cell structure being provided with a material for forming outer wall comprising an unfired cell structure and a material for forming outer wall disposed on the outer peripheral surface of the unfired cell structure.

20. A honeycomb structure according to claim 15, wherein the cell structure is a fired cell structure produced by firing a cell structure being provided with a material for forming outer wall comprising a cell structure fired in advance and a material for forming outer wall disposed on the outer peripheral surface of a fired cell structure.

21. A honeycomb structure according to claim 15, wherein the main component of the outer wall after firing is cordierite.

22. A honeycomb structure according to claim 15, wherein the cell structure being provided with a material for forming outer wall is produced so that the absolute value of the difference between the proportion of shrinkage in the size of the cell structure after firing to the size of the cell structure before firing and the proportion of shrinkage in the size of the material for forming outer wall after firing to the size of the material for forming outer wall before firing is not more than 0.3%.

23. A honeycomb structure according to claim 15, wherein the absolute value of the difference between the coefficient of thermal expansion of the cell structure after firing and that of the outer wall after firing is not more than $0.4 \times 10^{-6}/°C$.

24. A honeycomb structure according to claim 15, wherein the cell structure has a section formed by cutting the cell structure after firing along a plane perpendicular to the central axis whose maximum diameter is not less than 150 mm.

25. A honeycomb structure according to claim 15, wherein the cell structure has an outer peripheral surface being formed of the surface of the outer peripheral wall provided on the outside of the cells positioned at the outermost periphery among a plurality of the cells.

26. A honeycomb structure according to claim 15, wherein the cell structure has an outer peripheral surface being formed of the surface of the partition walls of the cells positioned at the outermost periphery among a plurality of the cells.

27. A honeycomb structure according to claim 15, wherein the outer peripheral surface of the cell structure is formed by grinding at least a part of the outer peripheral wall of the cell structure comprising a plurality of cells serving as fluid flowing channels and provided with the outer peripheral wall on the outside of the cells positioned at the outermost periphery among a plurality of the cells.

28. A honeycomb structure according to claim 15, wherein the surface of the outer wall of the honeycomb structure provided with the outer wall on the outer peripheral surface of the cell structure is subjected to a surface working.

29. A honeycomb structure according to claim 15, wherein the honeycomb structure is cylindrical and the difference between the maximum diameter and the minimum diameter of the cylindrical honeycomb structure is not more than 1 mm.

* * * * *